United States Patent [19]

Parker, Sr.

[11] 4,274,009
[45] Jun. 16, 1981

[54] SUBMERGED HYDROELECTRIC POWER GENERATION

[76] Inventor: George Parker, Sr., 3105 Brawner Pkwy., Corpus Christi, Tex. 78415

[21] Appl. No.: 959,217

[22] Filed: Nov. 9, 1978

Related U.S. Application Data

[63] Continuation-in-part of Ser. No. 854,651, Nov. 25, 1977, abandoned.

[51] Int. Cl.³ .............................................. F03B 13/10
[52] U.S. Cl. ........................................ 290/43; 290/54; 415/2 R
[58] Field of Search ................ 290/43, 44, 52, 54, 290/55; 415/2, 108, 146–148, 150, 151, 217; 416/179, 180, 189

[56] References Cited

U.S. PATENT DOCUMENTS

| | | | |
|---|---|---|---|
| 2,501,696 | 3/1950 | Souczek | 290/43 |
| 2,706,255 | 4/1955 | Breaux et al. | 290/55 X |
| 3,209,156 | 9/1965 | Struble, Jr. | 290/54 |
| 3,678,285 | 7/1972 | Griffith | 290/52 X |
| 3,986,787 | 10/1976 | Mouton, Jr. et al. | 290/54 X |
| 4,075,500 | 2/1978 | Oman et al. | 415/DIG. 1 |

FOREIGN PATENT DOCUMENTS

| | | | |
|---|---|---|---|
| 256035 | 11/1963 | Australia | 415/2 |
| 735040 | 11/1932 | France | 415/2 |

*Primary Examiner*—Stanley J. Witkowski
*Assistant Examiner*—W. E. Duncanson, Jr.
*Attorney, Agent, or Firm*—G. Turner Moller

[57] ABSTRACT

Electric power is generated by power generators submerged to a substantial depth in a body of moving water. The generators are housed in bodies configured to create a large pressure differential across a conduit. This generates a rapid, substantial flow of water through a conduit in which is located an impeller which is driven to energize a generator to thereby generate electricity.

27 Claims, 4 Drawing Figures

SUBMERGED HYDROELECTRIC POWER GENERATION

This application is a continuation-in-part of application Ser. No. 854,651 filed Nov. 25, 1977 now abandoned.

This invention relates to the generation of electric power in relatively deep bodies of moving water.

It is apparent that substantial efforts are presently being spent to derive energy from naturally occuring, almost limitless sources such as sunlight and wind. One area in this catagory that has apparently escaped substantial attention is moving bodies of deep water such as the Gulf Stream, the Japanese current, in the straits of Gibralter, in the Yucatan channel and the like. There is reported information which indicates that some of these bodies exhibit steady flow velocities in the range of 2-6 knots. It is evident that the kinetic energy in moving water at these velocities is substantial if it can be harnessed. As will be more fully apparent hereinafter, the hydrostatic pressure existing at substantial depths is utilized in this invention to create a localized very rapid water stream which contains sufficient energy to drive an impeller and generate significant quantities of electricity.

There have been attempts in the prior art to use the kinetic energy of flowing water in streams, rivers and the like to generate electricity as shown in exemplary U.S. Pat. Nos. 868,798; 1,123,491 and 2,501,696. It will be evident, upon examination, that these devices use the inherent or natural flow of moving water to generate power and do not generate substantial amounts of energy.

Other disclosures, such as in exemplary U.S. Pat. No. 2,163,102, are designed for use in conjunction with dams and relatively stationary bodies of water and are, so far as is known, not suitable for use in generating electricity from moving water at substantial depth.

The prior art is replete with wind driven generators such as shown in exemplary U.S. Pat. Nos. 3,339,078; 3,513,326; 3,556,239 and 4,075,500. There are several distinguishing characteristics between devices designed to utilize wind energy to generate power and those designed to use a relatively deep moving body of water.

First, wind powered generators utilize and operate on air which is readily expansible and compressible whereas water is a substantially incompressible medium. For example, at 6000 psia and 200° F., the compressibility of pure water is approximately $2.9 \times 10^{-6}$ barrels per barrel per psi. As pointed out in Petroleum Reservoir Engineering, McGraw-Hill Book Co., 1960 Edition, pages 452-455, the compressibility of water varies with pressure, temperature, gas in solution and salinity. Generally, the compressibility of water decreases with increasing pressures, increases with increased amounts of gas in solution, and increases with salinity. The relationship to water compressibility to temperature is more complex since it appears that compressibility declines at increasing temperatures to about 140° F. and then increases. The water conditions in deep moving water bodies of the type previously mentioned indicate that pressure will be high, there will be little gas in solution and salinities will be moderate. The compressibility of water existing in these bodies will be quite low, normally less than $5 \times 10^{-6}$ unit volume per unit volume per psi.

Second, wind driven generators operate under atmospheric conditions so that the operating pressure will be somewhere in the range of 1-15 psia depending on the altitude of the generator and the weather system existing at the site. Generators of the type envisioned by this invention operate at substantially higher pressures depending on the depth of the generator. For example, the following table correlates the pressure to which the generator of this invention is exposed at various operating depths:

TABLE I

| Depth of Generator | Pressure in psia |
|---|---|
| 200 | 103.6 |
| 500 | 236.7 |
| 1000 | 458.7 |
| 1500 | 681.3 |
| 2500 | 1124.7 |
| 5000 | 2234.7 |

The pressure values assume atmospheric pressure to be 14.7 psia and water density to be 64 pounds/cubic foot.

Third, wind generators operate at rather high wind velocities. Generally, the amount of power obtainable from a wind driven generator varies exponentially with wind velocity. Consequently, wind driven generators are clearly not economic at any but extremely high wind velocities. Given the state of the art at the present time, there are few or no operating sites in the continental United States where wind velocities are sufficiently high and sufficiently steady to economically produce electricity in substantial quantities. To indicate a comparison of the fluid velocities to which wind driven generators and generators of this invention are exposed, the following tables are offered:

TABLE II

| Wind Velocities | |
|---|---|
| Miles per Hour | Feet per Second |
| 10 | 14.7 |
| 20 | 29.3 |
| 30 | 44.0 |
| 40 | 58.7 |

Given the present state of the art, wind driven generators are not economic at these velocities to produce substantial quantities of electricity.

TABLE III

| Water Velocities | |
|---|---|
| Knots | Feet per second |
| 2 | 3.4 |
| 4 | 6.8 |
| 6 | 10.1 |
| 8 | 13.5 |

It will accordingly be seen that the highest steady water velocities which can be found in nature are lower than very moderate wind velocities which occur in many locations throughout the world.

In summary, this invention provides a new and improved technique for generating electrical power in response to the flow of a moving body of water while submerged to a substantial depth therein. A streamlined body member encloses an electrical generator which is equipped with an impeller and shaft. An inlet shroud provides an inlet tube portion housing, in a preferred embodiment of the invention, a control valve and a wicket structure. The impeller is located immediately downstream of the wicket structure. The shroud diverges so that flowing water externally thereof is accelerated. Water flowing through the inlet tube portion and past the impeller exits from the shroud at a location where the externally moving water has created a low pressure area called a nappe. The pressure in the nappe is substantially lower than the hydrostatic pressure to which the water inlet is exposed. There is accordingly created a large pressure differential between the nappe, which comprises the outlet of the water path through the device, and the inlet tube which is exposed to hydrostatic pressure. This large pressure differential generates a substantial water flow through the inlet tube portion at a substantial flow velocity.

In the preferred embodiment of the invention, a control mechanism is provided which senses the output of the electrical generator. When the voltage output exceeds a predetermined amount, a flow control valve in the inlet tube is actuated to decrease water flow past the impeller. When the sensed voltage decreases, the valve is opened toward its fully open position.

It is an object of this invention to provide a new and improved technique for obtaining energy from a deep moving body of water.

IN THE DRAWINGS

Figure 1:
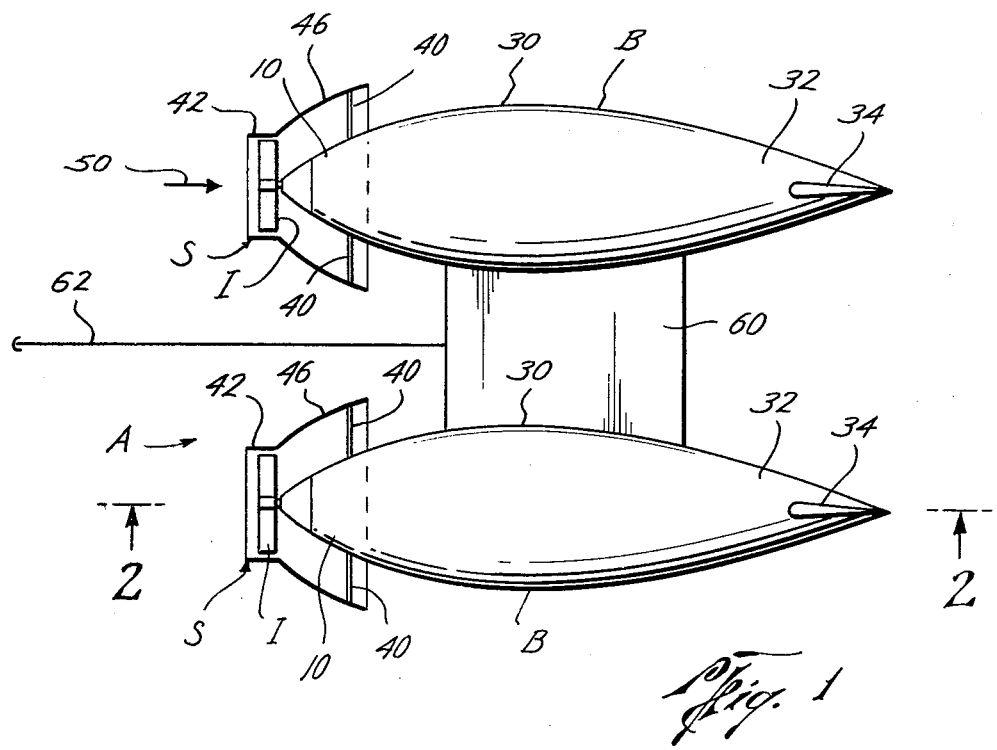
FIG. 1 is a plan view, partly in section, of one embodiment of this invention.
Figure 2:
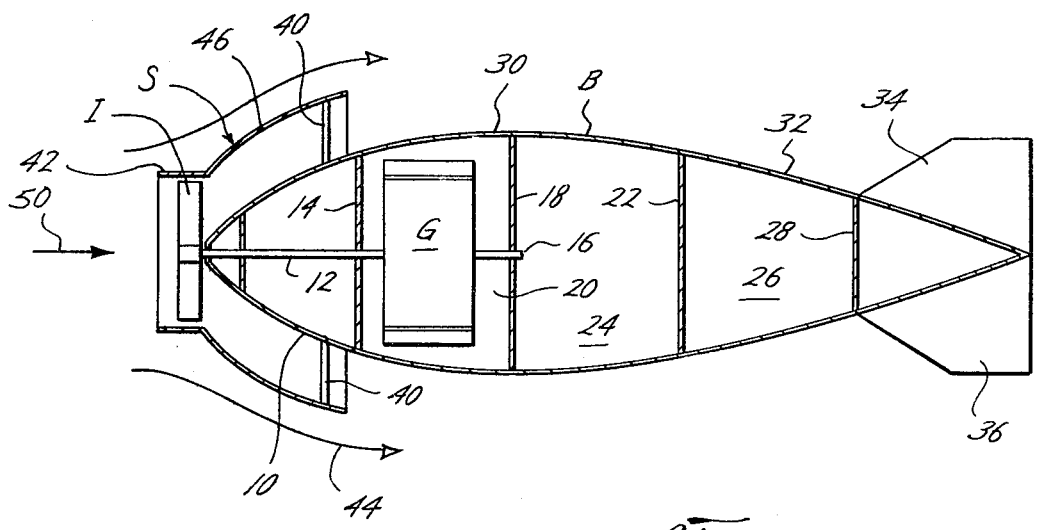
FIG. 2 is an enlarged cross-sectional view of the embodiment of FIG. 1 taken substantially along line 2—2 of FIG. 1 as viewed in the direction indicated by the arrows.

Referring to FIGS. 1 and 2, an apparatus A of this invention is designed to be submerged in a moving body of water at substantial depth. The apparatus A is submerged to a depth of at least 100 feet and preferably is submerged to substantially greater depths to take advantage of the increasing hydrostatic pressure at increasing depth as will be more fully apparent hereinafter. The apparatus A is accordingly submerged in such bodies of water as the Gulf Stream between Florida ad Bimini, in the Straits of Gibraltar, and the like.

In selecting a location for the apparatus A, it is desired to have a body of water of substantial depth which exhibits a substantial steady flow velocity. It is also preferable that the flow direction of the water body be substantially uniform. Although significant quantities of electricity can be generated at relatively low natural flow rates, for example approximately one knot, it is preferred that the existing natural flow velocity be substantially higher, for example above about 3–4 knots.

The apparatus A comprises one or more body members B having therein an electrical generator G driven by an impeller I mounted with or adjacent a front or nose portion 10 of the body member B. The impeller I is mounted within an inlet shroud S as will be more fully apparent hereinafter.

The impeller I is mounted on a shaft 12 which passes through a suitable sealed opening in the nose portion 10 and through a bulkhead or partition 14 within the body member B. The shaft 12 is mechanically connected to a rotor of the generator G and drives the generator G when the impeller I rotates in response to the flow of water through the inlet shroud S. An extension 16 of the shaft 12 may extend through the generator G to a bulkhead 18 to support the generator rotor in a compartment 20 defined by the bulkheads 14, 18. The generator G is connected through suitable electrical conductors, as more fully pointed out hereinafter, to pass through suitable sealed openings in the body member B to a surface or submerged location for use of the electrical power generated in the apparatus A.

A bulkhead 22 defines, in conjunction with the bulkhead 18, a control or instrumentation compartment 24 for receiving control instrumentation or electronics for the generator G such as voltage and current regulation circuitry.

A pressure compartment 26 is formed by the bulkhead 22 and a bulkhead 28 for the receipt of a suitable pressurized gas such as nitrogen through a suitable pressure inlet opening. The pressurized gas is contained in the pressurized compartment 26 for maintaining the pressure within the body member B to a value substantially above atmospheric pressure, for example equal to the hydrostatic head at the desired operating depth of the apparatus A. It will accordingly be seen that this internal pressure and/or the bulkheads 14, 18, 22, 28 as well as suitable struts in the body member B along with a relatively thick plating may cooperate to withstand the hydrostatic pressure existing at the operating depth.

The body member is generally streamlined in its external configuration to facilitate the flow of water therepast. The body member B tapers outwardly from the nose portion 10 to an intermediate portion 30 and then inwardly to a rear or tail portion 32. Vertical fins 34, 36 are mounted with the tail portion 32 to ensure that the apparatus A is properly aligned and facing in the proper direction to receive the flow of water through the inlet shroud S past the impeller I.

The impeller I is mounted within the inlet shroud S adjacent the nose portion 10 of the body member B. The inlet shroud S is mounted with support struts 40 to the body member B and includes a tubular inlet section 42 and an outlet or guide shroud 46 which are connected together adjacent the impeller I. If desired, suitable screening may be mounted adjacent the inlet to the inlet tube 42 to protect the impeller blade I from debris and the like in the water. The outlet shroud 46 is of similar configuration to the nose portion 10 of the body member B.

Figure 3:
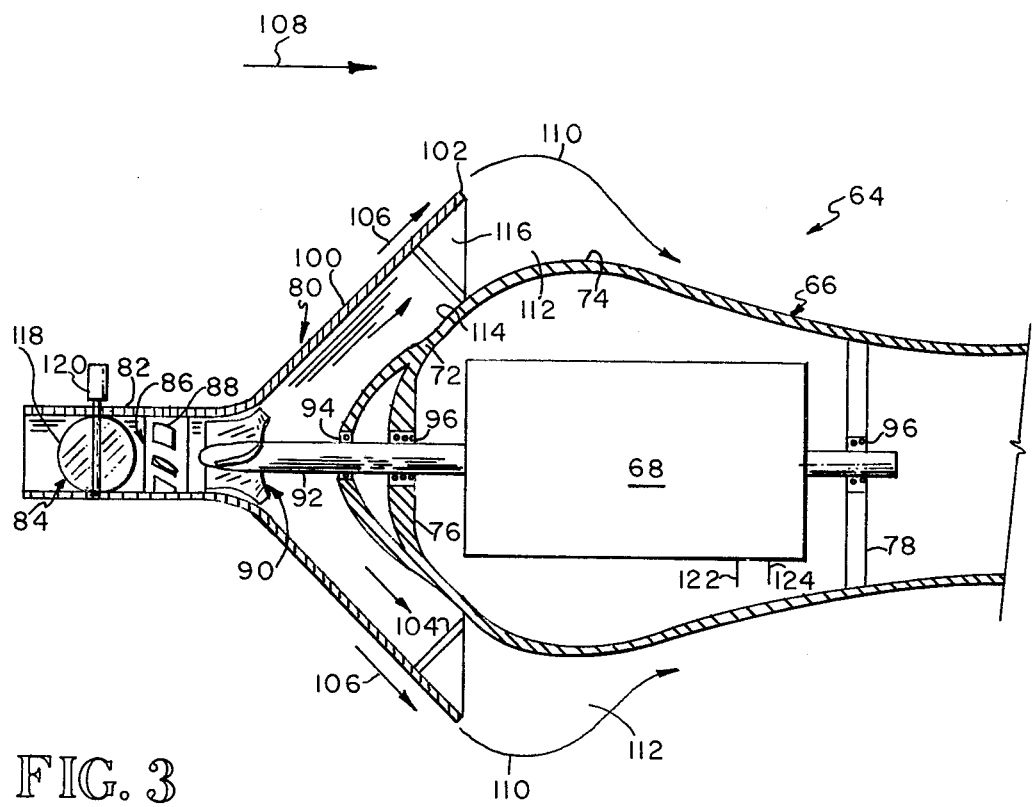
FIG. 3 is a partial cross-sectional view, similar to FIG. 2, of another embodiment of the invention.

As will be pointed out more fully in conjunction with FIG. 3, it should be noted that the guide shroud 46 diverts a first or external portion of water passing the body member B to an acute angle relative to or transverse to the normal generally water flow direction as suggested by an arrow 44. The water passing externally of the guide shroud 46 is accelerated and passes over the terminal end of the shroud 46 and generates a low pressure area or nappe of generally annular configuration between the shroud terminus and the body member B. The kinetic energy of the flowing water external of the shroud S offsets the downward forces of the head of water above the apparatus A and thereby reduces the water pressure in the nappe which is disposed at the outlet of the flow path between the shroud S and the nose portion 10. The pressure head at the inlet tube 42 exceeds this reduced pressure and forces the water past the impeller I thereby causing the impeller I to rotate. It will accordingly be seen that the pressure differential between the inlet of the tube 42 and outlet of the flow path leading from the impeller I is a function of the depth to which the apparatus A is submerged. Accordingly, the apparatus A is preferably submerged to a substantial depth of least 100 feet, desirably at least 400 feet and preferably at least 1500 feet.

It is additionally important to note that the outer shroud 46 is spaced from the nose portion 10 by the support struts 40 a distance so that the internal cross-sectional area of the annular flow passage formed between the shroud 46 and the nose portion 10 of the body member B in a plane perpendicular to the direction of entry of fluid into the outlet shroud 46 (as indicated by an arrow 50) is greater than the cross-sectional area for passage of fluid within the inlet tube 42.

The creation of the nappe is basically due to Newton's First Law. Water passing over the terminus of the shroud S at a substantial velocity cannot have its direction of movement changed instantaneously. Accordingly, water passing over the terminus of the shroud S does not reapproach the body B until some distance downstream of the terminus of the shroud S. The length of the nappe in the direction of water movement is subject to a number of factors including the speed of the water adjacent the shroud terminus, and the like.

In usual situations, it is preferable to use a plurality of generators G each in a body member B configured to counter-rotate so as to overcome torque imbalance. Where more than one body member is to be used to generate electrical power (FIG. 1), such body members are preferably connected by a wing or vane 60. The vane 60 is connected by a cable or chain 62 to a suitable foundation or mooring in order to anchor the body members B in position. Electrical cables to convey electrical power from the generator G to a user may thus be mounted with or without the cable 62, if desired. Where only a single body member is used, the cable 62 may be attached to the body member B for anchoring purposes and transferring electrical energy for subsequent use.

Figure 4:
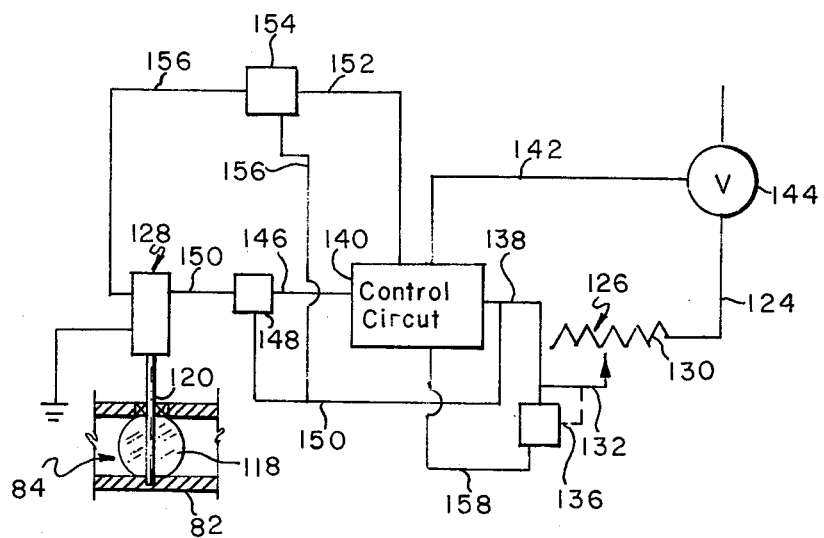
FIG. 4 is a circuit diagram illustrating control of an inlet valve.

Referring to FIGS. 3 and 4, there is illustrated a preferred embodiment 64 of this invention which comprises, as major components, a body 66 housing a generator 68 and a shroud 70.

The body 66 may be of similar construction to the body member B and accordingly comprises a closed external shell providing a nose portion 72 and a generally annular section 74, the function of which will be more fully apparent hereinafter. A plurality of partitions 76, 78 are emloyed to divide the body into a plurality of compartments housing various components of the apparatus 64. The body 66 is designed to withstand the hydrostatic pressure at the operating depth either by so designing the structural framework thereof or by partially offsetting the hydrostatic pressure with increased gaseous pressure inside the shell.

The shroud 80 comprises an inlet conduit 82 of any desired cross-sectional shape having therein a valve 84, a wicket structure 86 having a plurality of stationary vanes 88 thereon for swirling the incoming water passing through the inlet 82 and an impeller 90 which is driven by water swirled by the wicket structure 88 and is connected by a shaft 92 to the generator 68.

The shaft 92 extends through a seal 94 sufficient to prevent water ingress into the body 66 and is rotatably supported by suitable bearings 96.

At a location adjacent the impeller 90, the shroud 80 comprises a structure 100 diverging from the inlet 82 toward a shroud terminus 102. The shroud terminus 102 overlies the nose portion 72 of the body 66 and is supported by suitable struts 104. The shroud terminus 102 preferably resides in a plane perpendicular to the axis of body 66.

The purpose of the divergent structure 100 is to accelerate water flowing past the exterior of the shroud 80 and deflect it in an inclined direction indicated by the arrow 106 relative to the normal water flow direction indicated by the arrow 108. As the water flow indicated by the arrow 106 passes the shroud terminus 102, its momentum causes it to assume a flow direction indicated by the arrow 110 to define a low pressure region or nappe 112 of generally annular configuration defined in part by the portion 74 of the body 66. The nappe 112 is in communication with a flow path 114 between the divergent structure 100 of the shroud 80 and the nose portion 72 of the body 66. The flow path 114 is in communication with the inlet 82 and provides for the movement of water from the downstream end of the impeller 90 into the nappe 112 through an outlet 116.

It is well known in the art that low pressure areas or nappes are created by water flowing over a weir. In a conventional weir, the pressure in the nappe is less than atmospheric unless the nappe is open to the atmosphere, as on the sides of the weir. In this regard, reference is made to Data Book for Civil Engineers, Design; Elwyn E. Seelye, 1945, pages 6–15.

The inclination of the divergent structure 100 is subject to design selection. The purpose of the inclination is, of course, to increase the size of the nappe 112 by causing water flowing past the terminus 102 to be angularly inclined relative to the normal direction 108 of water flow. Inclinations which are too nearly parallel to the normal water flow direction 108 and inclinations which are too nearly perpendicular to the normal water flow direction 108 do not increase the size of the nappe 112 to the same extent as intermediate acute angles. Accordingly, it is preferred that the inclination of the divergent structure 100 be in the range of 30°–60° relative to the normal water flow direction 108. Most desirably, the inclination of the divergent structure 100 is on the order of about 45°.

The valve 84 may be of any suitable type and is illustrated as of the butterfly variety comprising a generally circular valve element 118 mounted by a pivot connection 120 to the inlet 82. Although the valve 84 may be separately controlled from the surface, it is preferred that the valve 84 be controlled automatically in response to the output of the generator 68 as is illustratively shown in FIG. 4.

Although the generator 68 may be designed to deliver alternating current, for purposes of illustration the generator 68 is illustrated as of the direct current type and has a pair of outputs 112, 124. For purposes of illustration, it is assumed that the output 122 is grounded to the sea floor, as through the cable or chain 62 illustrated in FIG. 1.

Referring to FIG. 4, a potentiometer 126 is connected to the output 124 and provides a source of power for a valve actuator 128. The potentiometer 126 comprises a resistor 130 having a movable contact 132 driven by an electric motor 134 connected through a mechanical connection 136 to the movable contact 132. The contact 132 is electrically connected to a lead 138 comprising the low voltage end of the resistor 130. The lead 138 connects to a control circuit 140 which is connected by a lead 142 to a voltmeter 144 in the output 124. The control circuit 140 is designed to sense the voltage signal delivered by the voltmeter 144 and provide an output control signal along a lead 146 to a relay 148 disposed in a power lead 150 interconnecting the valve actuator 128 and the low voltage lead 138. It will accordingly be seen that when the voltage sensed by the voltmeter 144 exceeds a predetermined value, the relay 148 is closed to energize the valve actuator 128 and move the valve 84 in a valve closing direction. This decreases the amount of water passing through the inlet 82 and thereby necessarily decreases the force applied to the impeller 90 to thereby decrease the amount of electricity delivered by the generator 68.

In the event the valve 84 is less than fully open and the voltage sensed by the voltmeter 144 is below a predetermined value, there is provided a subcircuit in the control circuit 140 for moving the valve 84 toward its fully open position. To this end, there is provided a signal carrying lead 152 connected to a relay 154 disposed in a power lead 156 interconnecting the valve actuator 128 and the low voltage lead 138. When the voltage sensed by the voltmeter 144 is below a predetermined value, a signal is delivered by the control circuit 140 to energize the relay 154 and thereby activate the valve actuator 128 to move the valve 84 in a valve opening direction.

In order to assure that the voltage appearing in the low voltage lead 138 is in a range adapted to drive the actuator 128, a feed back loop 158 may be provided between the control circuit 140 and the motor 134 to actuate the motor 134 in a voltage increasing direction if the operating voltage on the low voltage lead 138 is too high and in a voltage decreasing direction if the operating voltage on the low voltage lead 138 is too low.

It will accordingly be seen that the valve 84 can be moved in a closing direction to decrease the quantity of electricity produced by the generator 68. In addition, the valve 84 may be moved toward its fully open position in the event the voltage output is below a predetermined value.

The foregoing disclosure and description of the invention are illustrative and explanatory thereof, and various changes in the size, shape and materials as well as in the details of the preferred embodiments may be made without departing from the spirit of the invention.

I claim:

1. An apparatus for generating energy in response to the flow of fluid therepast while submerged in a body of water, comprising
    a body member having a streamlined external configuration from a front end to a rear end thereof for ease of water flow therepast;
    a rotatable energy converting device mounted in said body member for converting, when driven, energy of rotation into a second type of energy;
    an impeller blade rotatably mounted with said front end of said body member for driving said energy converting device in response to flow of water therepast; and
    an inlet shroud mounted with said front end of said body member and containing said impeller blade therein, said inlet shroud comprising
        an inlet for conveying the water to said impeller blade; and
        a guide shroud, overlapping said body member and having a terminal edge spaced from said body member, for diverting water flowing externally of the apparatus to an angle transverse the horizontal flow and discharging the externally flowing water along said terminal edge at a location spaced from said body member, the guide shroud comprising means for generating a nappe, exhibiting lower pressure than water surrounding said body member, bounded in part by said terminal edge and the exterior of said body member, the nappe communicating with the inlet shroud and reducing the water pressure within said shroud to cause flow of the water past said impeller blade.

2. The apparatus of claim 1 wherein said body member includes a nose portion at said front end, tapering outwardly to an intermediate portion and tapering inwardly to said rear end.

3. The apparatus of claim 1 wherein said guide shroud is of like configuration to said front end of said body member.

4. The apparatus of claim 1 wherein said guide shroud is mounted with said front end of said body member to form an annular flow path passage therebetween.

5. The apparatus of claim 1 wherein said guide shroud and said inlet are connected to each other.

6. The apparatus of claim 5 wherein said impeller blade is mounted with said inlet shroud adjacent the connected between said guide shroud and said inlet.

7. The apparatus of claim 1 further including means for connecting said body member to a submerged floor of the body of water.

8. An apparatus for generating energy in response to the flow of fluid therepast while submerged in a body of water, comprising
    a plurality of body members having a streamlined external configuration from a front end to a rear end thereof for ease of water flow therepast;
    means interconnecting said body members;
    a rotatable energy converting device mounted in each of said body members for converting, when driven, energy of a rotating shaft into into energy of a different kind;
    an impeller blade rotatably mounted with said front end of each of said body members for driving said energy converting device in response to flow of water therepast; and
    an inlet shroud mounted with said front end of each of said body members and containing said impeller blade therein, said inlet shroud comprising
        an inlet for conveying the water to said impeller blade; and
        a guide shroud including means for generating a nappe exhibiting lower pressure than the water surrounding the body member and bounded in part by the exterior of said member for diverting externally flowing water to an angle transverse the horizontal flow to increase the kinetic energy thereof, to cause flow of water past said impeller blade.

9. A method of generating energy at a substantial depth in a body of moving water having a predetermined normal generally horizontal direction of movement, comprising
    anchoring a body, having therein an energy converting device, in the water at a depth of at least 100 feet;
    generating a nappe bounded in part by the body by diverting a first portion of the water moving past the body along the exterior of a shroud at an acute angle to the normal direction of water movement, then passing the first portion of water past a terminus of the shroud at a location spaced from the body and directing the first portion of water away from the body for creating the nappe, adjacent the terminus, of substantially lower pressure than the normal existant hydrostatic head of the water;

moving a second portion of the water flowing past the body through a laterally confined water flow path having an outlet in the low pressure nappe and an inlet open to the hydrostatic head of water;

driving an impeller, connected to the energy converting device, with the second portion of water; and delivering energy from the energy converting device.

10. The method of claim 9 wherein the body section is of a closed periphery and the generating step comprises creating a generally annular low pressure area about the section of closed periphery.

11. The method of claim 9 further comprising monitoring a condition of the energy converting device and regulating the quantity of the second portion of water in response thereto.

12. The method of claim 11 wherein the energy converting device is an electrical generator and the delivering step comprises delivering electrical power from the generator.

13. The method of claim 12 wherein the monitoring step comprises monitoring a function of the output of the generator and the regulating step comprises decreasing the quantity of the second portion of water in response to a value of the function indicating an excess of electrical generation.

14. The method of claim 13 wherein the function monitored is voltage and the regulating step comprises decreasing the quantity of the second portion of water in response to a voltage output in excess of a predetermined value.

15. The method of claim 12 wherein the monitoring step comprises monitoring a function of the output of the generator and the regulating step comprises increasing the quantity of the second portion of water in response to a value of the function indicating that the generator is producing less than maximum electricity.

16. The method of claim 15 wherein the function monitored is voltage and the regulating step comprises increasing the quantity of the second portion of water in response to a voltage output in excess of a predetermined value.

17. Electricity produced by the process of claim 12.

18. The method of claim 9 wherein the body is anchored at least 400 feet below the surface of the water.

19. The method of claim 18 wherein the body is anchored at least 1500 feet below the surface of the water.

20. Apparatus for generating energy in response to the flow of water therepast while submerged in a body of water coving in a normal predetermined direction, comprising a compartment having an external skin and means for strengthening the skin to withstand the hydrostatic pressure of at least 400 feet of water;

an energy converting device in the compartment for generating energy when driven;

a shaft, having an impeller thereon, extending through an opening in the compartment, for driving the energy converting device in response to the flow of water therepast;

means for preventing water entrance, at a hydrostatic pressure of at least 400 feet of water, into the compartment between the shaft and coupling;

a conduit having the impeller therein providing a water flow path from an inlet exposed to hydrostatic water pressure to an outlet exhibiting a substantially decreased pressure; and means for generating, in response to water flow therepast, A nappe bounded in part by the external compartment skin and exhibiting a lower pressure than water surrounding the apparatus and being adjacent the conduit outlet.

21. The apparatus of claim 20 further comprising a body section rigid with the compartment and wherein the low pressure area generating means includes a shroud having a terminus spaced from the body section and defining the conduit outlet between the terminus and the body section.

22. The apparatus of claim 21 wherein the shroud is divergent in the predetermined direction for diverting water flowing externally of the conduit at an acute angle relative to the predetermined direction.

23. The apparatus of claim 22 wherein the body section is of closed periphery and comprises part of the compartment and wherein the shroud terminus overlaps a portion of the compartment.

24. The apparatus of claim 23 wherein the body section is generally symmetrical about an axis of the apparatus generally parallel to the normal direction of water flow and wherein the low pressure generating means comprises means for generating an annular section of low pressure extending about the body section.

25. The apparatus of claim 24 wherein the shroud provides a large end surrounding and spaced from the body section and a small end, the conduit outlet being defined between the large end of the shroud and the body section.

26. The apparatus of claim 20 further comprising means for monitoring a condition of the energy converting device and means responsive to the monitored condition for regulating the quantity of water passing through the conduit.

27. The apparatus of claim 26 wherein the monitoring means includes means for monitoring a function of the output of the energy converting device.

* * * * *